United States Patent
Chen

(10) Patent No.: US 11,686,974 B2
(45) Date of Patent: Jun. 27, 2023

(54) DISPLAY PANEL AND DISPLAY APPARATUS

(71) Applicant: Shanghai Tianma Micro-Electronics Co., Ltd., Shanghai (CN)

(72) Inventor: Haijing Chen, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 84 days.

(21) Appl. No.: 16/702,162

(22) Filed: Dec. 3, 2019

(65) Prior Publication Data

US 2020/0310181 A1  Oct. 1, 2020

(30) Foreign Application Priority Data

Mar. 29, 2019 (CN) .......................... 201910251380.9

(51) Int. Cl.
*G02F 1/13363* (2006.01)

(52) U.S. Cl.
CPC .... *G02F 1/13363* (2013.01); *G02F 1/133631* (2021.01)

(58) Field of Classification Search
None
See application file for complete search history.

(56) References Cited

U.S. PATENT DOCUMENTS

| | | | | |
|---|---|---|---|---|
| 7,164,532 B2* | 1/2007 | Funato | ................. | G11B 7/1275 359/489.06 |
| 2006/0256244 A1* | 11/2006 | Jak | .................... | G02F 1/133615 349/33 |
| 2007/0024975 A1* | 2/2007 | McGrew | ............ | G02B 27/4261 359/489.06 |
| 2007/0070276 A1* | 3/2007 | Tan | ...................... | G02B 5/3083 349/117 |
| 2009/0322988 A1* | 12/2009 | Kim | ...................... | G02B 6/0056 349/65 |
| 2014/0063356 A1* | 3/2014 | Liao | .................... | H04M 1/0264 349/2 |

* cited by examiner

*Primary Examiner* — Anthony J Frost
(74) *Attorney, Agent, or Firm* — Anova Law Group PLLC

(57) ABSTRACT

A display panel and a display apparatus are provided. The display panel includes a display substrate and a birefringence layer disposed on a display surface of the display substrate. The birefringence layer includes a first region; the first region is disposed at least in the display region; a plurality of repeating units are sequentially disposed in the first region along a first direction parallel to the display surface of the display substrate, and one repeating unit includes at least two refractive regions that are sequentially arranged along the first direction to form. Refractive indexes of the at least two refractive regions are different from each other. An interface between the at least two refractive regions forms an acute angle α with the display surface of the display substrate. A width of the repeating unit is smaller than a wavelength of light emitted from the display panel.

13 Claims, 9 Drawing Sheets

DISPLAY PANEL AND DISPLAY APPARATUS

CROSS-REFERENCES TO RELATED APPLICATIONS

This application claims priority of Chinese Patent Application No. 201910251380.9, filed on Mar. 29, 2019, the entire contents of which are hereby incorporated by reference.

FIELD OF THE DISCLOSURE

The present disclosure generally relates to the field of display technology and, more particularly, relates to a display panel and a display apparatus.

BACKGROUND

With the development of the technologies, such as big data, cloud computing and mobile internet, etc., human beings have entered the intelligent era. Intelligent apparatus, including smart mobile communication terminals, smart wearable devices and smart home systems, have become indispensable parts of work and life. As an important window of the human-computer interaction in the intelligent era, the display panel is also undergoing major changes. Among different types of display panels, the organic light-emitting display panel has become a new generation of display apparatus after the liquid-crystal display devices because of its small thickness, lighter weight, active light-emitting, brighter picture, low power consumption, good flexibility and wide color gamut, etc.

An organic light-emitting display panel often includes an array substrate, an organic light-emitting device layer on the array substrate, and an encapsulation layer encapsulating the organic light-emitting device layer. The organic light-emitting device layer is formed by evaporating an organic light-emitting material on the array substrate. Each of the organic light-emitting devices corresponds to one sub-pixel of the display panel. Therefore, the greater the arrangement density of the organic light-emitting devices is, the higher the resolution of the organic light-emitting display panel is. However, because of the limitations of the accuracy of the vapor deposition mask (fine metal mask, FMM), the alignment deviation, and the exposure accuracy, further increasing the resolution of the organic light-emitting display panel is facing challenges.

Therefore, there is a need to provide a display panel to further increase the resolution of the display apparatus. The disclosed display panel and display apparatus are directed to solve one or more problems set forth above and other problems in the art.

BRIEF SUMMARY OF THE DISCLOSURE

One aspect of the present disclosure provides a display panel. The display panel may include a display substrate and a birefringence layer disposed on a display surface of the display substrate. The birefringence layer may include at least one first region, the at least one first region may be disposed at least in the display region, in the first region a plurality of repeating units may be sequentially disposed along a first direction parallel to the display surface of the display substrate, and one of the plurality of repeating units in the first region may include at least two refractive regions that are sequentially arranged along the first direction. In one of the plurality of repeating units, refractive indexes of the at least two refractive regions may be different from each other; an interface between the at least two refractive regions may be a first interface; the first interface may form an acute angle $\alpha$ with the display surface of the display panel; a direction perpendicular to the first interface may be a second direction; a width of the repeating unit along the second direction may be f; $\lambda$, may be a wavelength of light emitted from the display panel; and f<$\lambda$.

Another aspect of the present disclosure provides a display apparatus. The display apparatus may include a display panel. The display panel may include a display substrate and a birefringence layer disposed on a display surface of the display substrate. The birefringence layer may include at least one first region, the at least one first region may be disposed at least in the display region, in the first region a plurality of repeating units may be sequentially disposed along a first direction parallel to the display surface of the display substrate, and one of the plurality of repeating units in the first region may include at least two refractive regions that are sequentially arranged along the first direction. In one of the plurality of repeating units, refractive indexes of the at least two refractive regions may be different from each other; an interface between the at least two refractive regions may be a first interface; the first interface may form an acute angle $\alpha$ with the display surface of the display panel; a direction perpendicular to the first interface may be a second direction; a width of the repeating unit along the second direction may be f; $\lambda$, may be a wavelength of light emitted from the display panel; and f<$\lambda$.

Other aspects of the present disclosure can be understood by those skilled in the art in light of the description, the claims, and the drawings of the present disclosure.

BRIEF DESCRIPTION OF THE DRAWINGS

The following drawings are incorporated in and constitute a part of the specification, illustrating embodiments of the present disclosure, and together with the detailed descriptions serve to explain the mechanism of the present disclosure.

DETAILED DESCRIPTION

Figure 1:
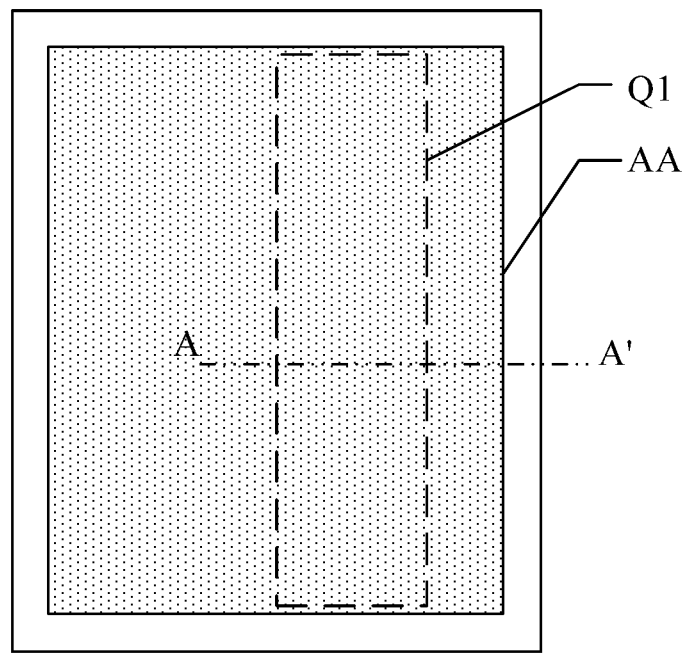
FIG. 1 illustrates a top view of an exemplary display panel consistent with various disclosed embodiments of the present disclosure.

Reference will now be made in detail to exemplary embodiments of the disclosure, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all the embodiments of the present disclosure. Based on the disclosed embodiments, persons of ordinary skill in the art may derive other embodiments consistent with the present disclosure, all of which are within the scope of the present disclosure. Further, in the present disclosure, the disclosed embodiments and the features of the disclosed embodiments may be combined when there are no conflicts.

Certain techniques, methods, and apparatus that are understandable to the persons of ordinary skill in the art may not be described in detail. However, under appropriate conditions, such techniques, methods and apparatus are also included as the parts of the description.

In the disclosed embodiments, specific values may be explained for illustrative purposes and might not be used as limitations. Thus, embodiments may have different specific values.

Further, the similar symbols and letters in the drawings may denote similar elements. Thus, once one element is defined in one drawing, it may not need to be defined in the following drawings.

Figure 2:
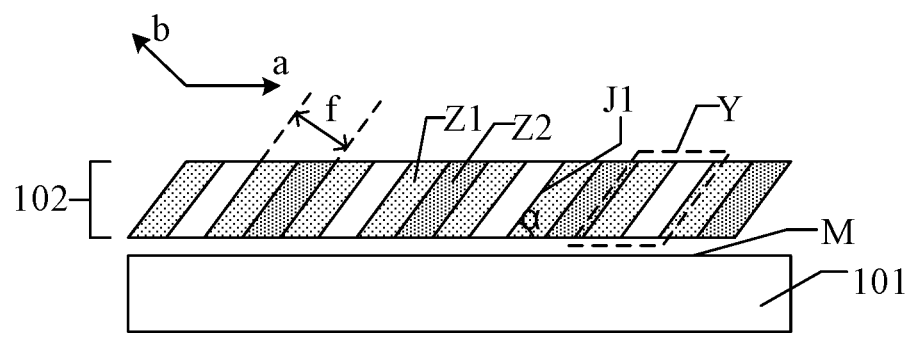
FIG. 2 illustrates an A-A'-sectional view of an exemplary first region of the display panel in FIG. 1 consistent with various disclosed embodiments of the present disclosure.
Figure 3:
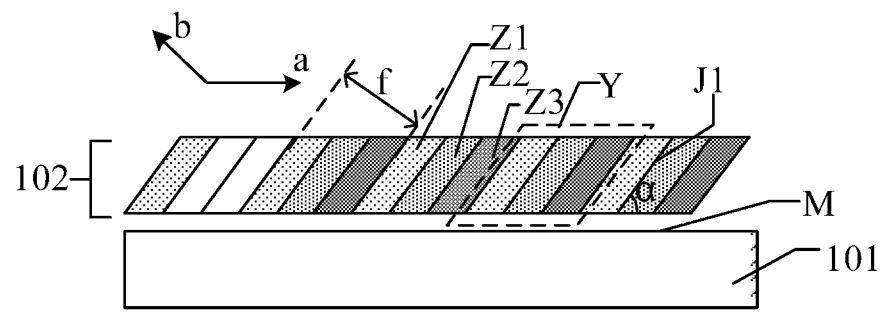
FIG. 3 illustrates an A-A'-sectional view of another exemplary first region of the display panel in FIG. 1 consistent with various disclosed embodiments of the present disclosure.

The present disclosure provides a display panel. FIG. 1 illustrates a top view of an exemplary display panel consistent with various disclosed embodiments of the present disclosure. FIG. 2 illustrates an exemplary A-A'-sectional view of a first region of the display panel in FIG. 1. FIG. 3 illustrates another exemplary A-A'-sectional view of the first region of the display panel in FIG. 1.

As shown in FIG. 1 and FIG. 2, the display panel may include a display area AA. The display panel may also include a display substrate 101, and a birefringence layer 102 disposed on a side of the display surface M of the display substrate 101. The display surface M may be the light-emitting surface of the display substrate 101. The birefringence layer 102 may include at least one first region Q1, and the at least one first region Q1 may be in the display region AA. The size and the position of the first region Q1 in FIG. 1 are only a schematic representation. In some embodiments of the present disclosure, a plurality of different first regions Q1 may be disposed in the birefringence layer 102 according to design requirements, or a first region Q may be disposed in the entire display area AA.

In the first region Q1, at least two refractive regions Z may be sequentially arranged along a first direction a to form a repeating unit Y (FIG. 2 illustrates the configuration that the two refractive regions Z are sequentially arranged along the first direction a to form a repeating unit Y; and FIG. 3 illustrates the configuration that three refraction regions Z are sequentially arranged along the first direction a to form a repeating unit Y), and a plurality of repeating units Y may be sequentially arranged along the first direction a. The first direction a may be parallel to the display surface M of the display substrate 101. In one repeating unit Y, the refractive indexes of the respective refractive regions Z may be different.

As shown in FIG. 2, the refractive regions Z may include a first refractive region Z1 and a second refractive region Z2. The first refractive region Z1 and the second refractive region Z2 may be alternately arranged along the first direction a. The refractive indexes of the first refractive region Z1 and the second refractive region Z2 may be different.

As shown in FIG. 3, the refractive regions Z may include alternatively distributed a first refractive region Z1, a second refractive region Z2, and a third refractive region Z3. The refractive indexes of the first refractive region Z1, the second refractive region Z2, and the third refractive region Z3 may be different.

Further, referring to FIG. 2 and FIG. 3, the interface between two adjacent refractive regions Z may be referred to as a first interface J1, and the first interface J1 may form an acute angle α with the display surface M of the display substrate 101. A direction perpendicular to the first interface J1 may be referred to as a second direction b. The width of one of the repeating units Y along the second direction b may be referred to as f; λ is the wavelength of light emitted from the display substrate 101; and f<λ. f may be the sum of the widths of all the refractive regions in one of the repeating units Y along the second direction b. To realize the color display of the display panel, the display substrate 101 may emit light of a plurality of colors, and the wavelengths of the lights of different colors may be different. In the present disclosure, the condition f<λ may be set. In particular, the width of one repeating unit Y may be smaller than the minimum wavelength of the visible light emitted from the display substrate.

In one embodiment, all the first interfaces J1 may be parallel to each other. In the first region of the present disclosure, at least two refractive regions having different refractive indexes may be sequentially arranged along the first direction to form a repeating unit. The first direction may be parallel to the display surface of the display substrate. Taking the first region illustrated in FIG. 2 as an example, the first refractive region Z1 and the second refractive region Z2 may be alternately arranged along the first region a. Because the refractive indexes of the first refractive region Z1 and the second refractive region Z2 may be different, after being alternatively arranged, the first region may be regarded as a whole region, for example, along a direction parallel to the first interface J1 and perpendicular to the first interface J1 (the second direction b), the refractive indexes of different regions of the first region may be different. In particular, the refractive indexes of the different regions of the first region may not be uniform, and the first region may be an anisotropic structure. As used herein, the "anisotropic" may mean that all or part of the chemical and physical properties of the substance change with the direction and exhibit different characteristics in different directions. When a natural light irradiates the first region, a birefringence may occur due to the anisotropy of the first region. In particular, a birefringent structure may be formed in at least the first region of the present disclosure. Because the refractive index in the first region is not uniform, the light may be diffracted when passing through the first region. In the present disclosure, the width f of the repeating unit Y along the second direction b is may be smaller than λ (f<λ) (λ is the wavelength of the incident light). The repeating unit Y may be able to effectively reduce the diffraction phenomenon and effectively avoid the influence of the diffraction phenomenon on the display effect of the display panel.

Figure 4:
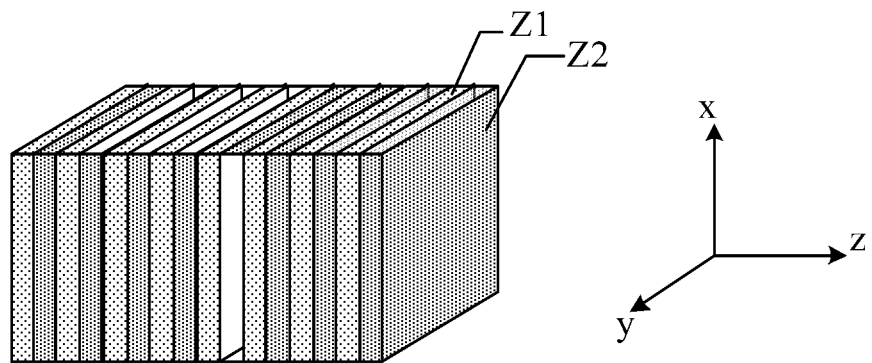
FIG. 4 illustrates a mechanism of an equivalent optical axis in a first region of an exemplary display panel consistent with various disclosed embodiments of the present disclosure.

FIG. 4 illustrates a schematic diagram showing the principle of the equivalent optical axis in the first region of an exemplary display panel consistent with various disclosed embodiments of the present disclosure. As shown in FIG. 4, a structure in which the first refractive region Z1 and the second refractive region Z2 are arranged as a repeating unit is taken as an example, and a coordinate system x-y-z is used. The x-axis direction and the y-axis direction are both parallel to the first interface J1 between the first refractive region Z1 and the second refractive region Z2. The z-axis direction is perpendicular to the first interface J1, and the z-axis direction is the normal direction of the contact interface of the first refractive region Z1 and the second refractive region Z2. In an anisotropic material, the dielectric constant E can be divided into vectors. In particular, it can be divided into a vector $\varepsilon_\parallel$ along the normal direction and a vector $\varepsilon_\perp$ perpendicular to the normal direction, and $\varepsilon_\parallel \neq \varepsilon_\perp$.

When the light propagates along the x-axis direction, the direction of the electric field intensity E of the light wave (the direction of vibration of the light is perpendicular to the direction of propagation) is in the zy plane. At this time, the dielectric constants along the y-axis direction may all be $\varepsilon_\perp$, and the dielectric constants along the z-axis direction may all be $\varepsilon_\parallel$. According to the approximate formula $n=\sqrt{\varepsilon}$ between the refractive index n and the dielectric constant ε, the refractive indexes of the light along the z-axis direction and the y-axis direction may be not equal due to $\varepsilon_\parallel \neq \varepsilon_\perp$. In particular, the birefringence may occur when light propagates along the x-axis direction and enters the first region. When the light propagates along the z-axis direction, the direction of the electric field intensity E of the light wave (the direction of vibration of the light is perpendicular to the direction of propagation) may be in the xy plane. At this time, the dielectric constants along the x-axis and the y-axis may be both $\varepsilon_\perp$. According to the approximate formula $n=\sqrt{\varepsilon}$ between the refractive index n and the dielectric constant ε, the refractive indexes of the light along the x-axis direction and the y-axis direction may be equal. In particular, the birefringence may not occur when the light propagates into the first region along the z-axis direction. Therefore, the direction of the equivalent optical axis of the first region in the present disclosure is the z-axis direction. In particular, the direction of the equivalent optical axis of the first region may be the direction perpendicular to the first interface.

In the present disclosure, the first region may be a birefringent structure having the birefringent characteristic, and the direction of its equivalent optical axis may be the direction perpendicular to the first interface. In particular, the direction of its equivalent optical axis may be the second direction.

Figure 5:
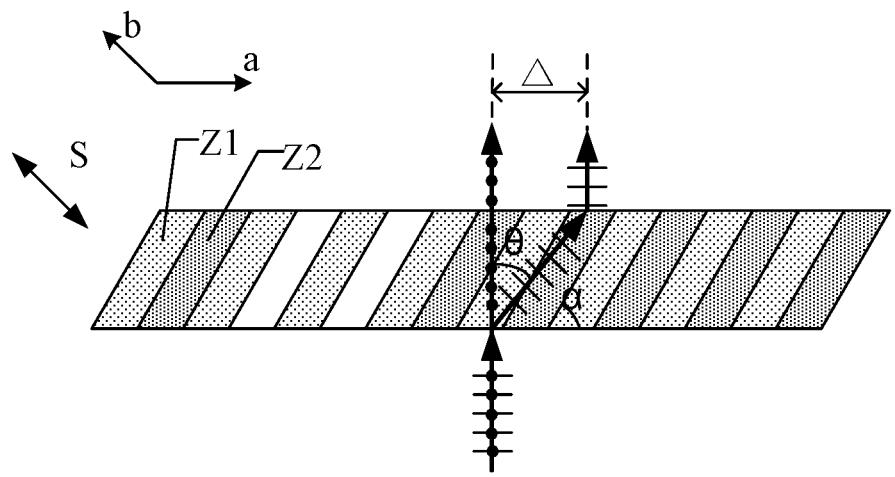
FIG. 5 illustrates an optical path of a birefringence occurred in a first region of an exemplary display panel consistent with various disclosed embodiments of the present disclosure.

FIG. 5 is a schematic diagram of an optical path in which the birefringence occurs in a first region of an exemplary display panel consistent with various disclosed embodiments of the present disclosure. As shown in FIG. 5, the structure in which the first refractive region Z1 and the second refractive region Z2 are alternatively arranged as a repeating unit is used as an example. The equivalent optical axis may be S, and the direction of the equivalent optical axis S may be the second direction b. When a natural light is incident on the first region, the birefringence may occur to generate an o-light (ordinary light) and an e-light (extraordinary light). The polarization direction of the o-light may be perpendicular to the paper surface, and the polarization direction of the e-light may be parallel to the paper surface. In the present disclosure, it may be assumed that the dielectric constant of the first refractive region is $\varepsilon_1$, the dielectric constant of the second refractive region is $\varepsilon_2$, and $\varepsilon_1 > \varepsilon_2$. Along the second direction b, the width of the first refractive region may be f1, and the width of the second refractive region may be f2. The ratio of the refractive region having a higher refractive index in the repeating unit may be referred to as a filling ratio q and the filling ratio $$q = \frac{f1}{f1+f2}.$$

Thus, the equivalent dielectric constant $\varepsilon_\parallel$ which is parallel to the direction of the equivalent optical axis S may be calculated as $$\varepsilon_\parallel \approx \frac{\varepsilon_2}{1-q} + \frac{\varepsilon_1}{q},$$

and the equivalent dielectric constant $\varepsilon_\perp$ perpendicular to the direction of the equivalent optical axis S may be $\varepsilon_\perp \approx (1-q)\varepsilon_2 + q\varepsilon_1$. Thus, $E_\parallel > \varepsilon_\perp$. Accordingly, the first region of the display panel provided by the present disclosure may be a negative optical axis birefringent structure as a whole. The optical path in which birefringence occurs in this structure is shown in FIG. 5.

Further, in the present disclosure, an acute angle α may be formed between the first interface J1 and the display surface M of the display substrate 101 such that a certain angle may be formed between the direction of the equivalent optical axis S and the display surface M of the display substrate 101. It may be assumed that when the first interface J1 and the display surface M of the display substrate 101 are perpendicular to each other, the direction of the equivalent optical axis S may be parallel to the display surface M of the display substrate 101, and the surface of the side of the first region Q1 of the birefringence layer 102 adjacent to the display face M may be an incident face. In particular, the direction of the equivalent optical axis S may be parallel to the surface of the first region Q1 and may be parallel to the incident face. According to the nature of the birefringent crystal with the negative optical axis, when the optical axis is parallel to the crystal surface and parallel to the incident surface, the direction of the o-light and the direction of the e-light may be the same, but the speeds may be different, and the birefringence may occur, but the optical axes may not visually separated. Therefore, in the present disclosure, setting the angle between the direction of the equivalent optical axis S and the display surface M of the display substrate 101 to be an angle other than 0 degree may ensure that the optical paths of the o-light and the e-light may be separated after the natural light is incident on the first region.

It should be noted that, in the drawings of the present disclosure, the direction indicated by the arrow is the propagation direction of the light. The line with circles indicates the polarization direction of the light is the direction perpendicular to the paper. The line having short horizontal lines indicates that the polarization direction of the light is in parallel with the surface of the paper. The line having the circles and the short horizontal lines indicates that the light is natural light.

Figure 6:
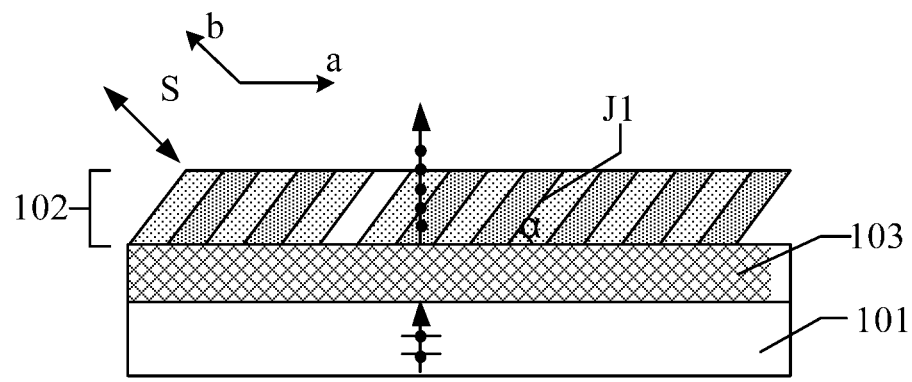
FIG. 6 illustrates light-emitting at a first time point at a position of the cross-section line A-A' in the first region in FIG. 1 consistent with various disclosed embodiments of the present disclosure.
Figure 7:
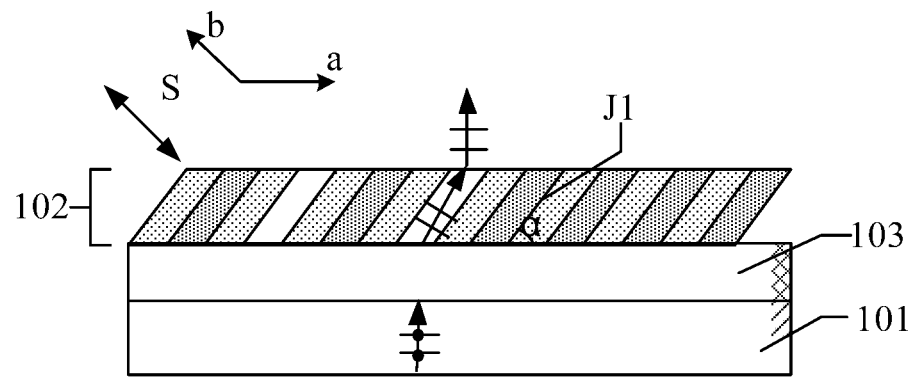
FIG. 7 illustrates light-emitting at a second time point at a position of the cross-section line A-A' in the first region in FIG. 1 consistent with various disclosed embodiments of the present disclosure.

FIG. 6 is a schematic diagram of the light-emitting at a first time point at the A-A' section of the first region in FIG. 1. FIG. 7 is a schematic diagram of the light-emitting at a second time point at the A-A' section of the first region in FIG. 1. The display panel provided by the present disclosure may further include a light valve 103. The light valve 103 may be disposed between the display substrate 101 and the birefringence layer 102, and the light valve 103 may be configured to control the polarization directions of the incident light of the birefringence layer.

In the present disclosure, the display substrate 101 may include a plurality of sub-pixels, and the light emitted by the sub-pixels may be natural light. In particular, the light may have a plurality of polarization directions. As shown in FIG. 6, the light valve 103 may control the polarization direction of the incident light of the birefringence layer to be a first polarization direction at the first time point, and the first polarization direction may be perpendicular to the equivalent optical axis S and parallel to the plane of the display panel. At the first time point, the incident light may be incident on the first region having the birefringent structure and may be emitted along the optical path of the o-light. In particular, an ordinary light (o-light) may be emitted. As shown in FIG. 7, the light valve 103 may control the polarization direction of the incident light of the birefringence layer to be the second polarization direction at a second time point. The second polarization direction may be perpendicular to the first polarization direction and may be in parallel with the plane of the display panel. At the second time point, after the incident light is incident on the first region having the birefringent structure, the light may be refracted in the first region, and may be emitted. The light transmitted through the birefringence layer 102 may be the extraordinary light (e-light) having the polarization direction of the second polarization direction. In particular, the extraordinary light may be emitted.

The first frame of image may be illustrated under the condition that the light valve may control the polarization direction of the incident light of the birefringence layer to be the first polarization direction at the first time point; and the second frame of image may be illustrated under the condition that the light valve may control the polarization direction of the incident light of the birefringence layer to be the second polarization direction at the second time point. The display panel provided by the present disclosure may include at least the following exemplary display modes.

Figure 8:
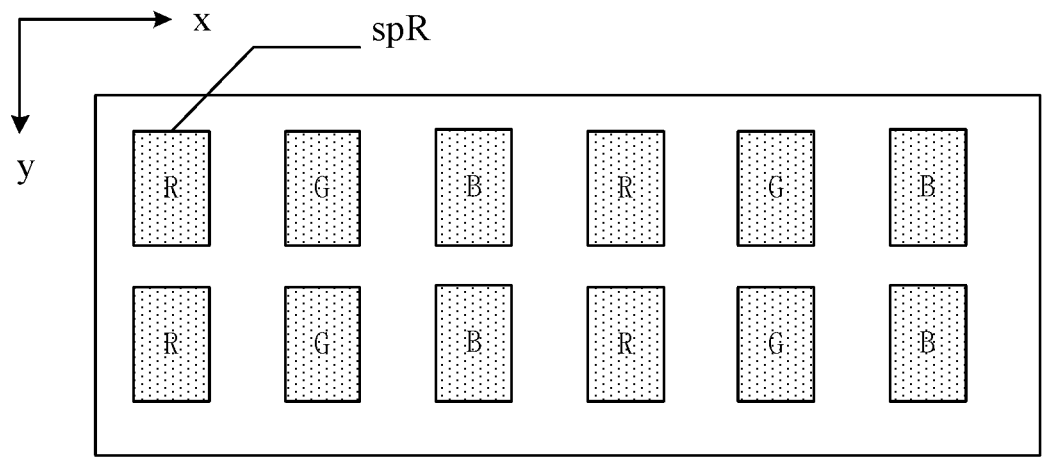
FIG. 8 illustrates grayscale of a first frame of image of an exemplary display panel consistent with various disclosed embodiments of the present disclosure.
Figure 9:
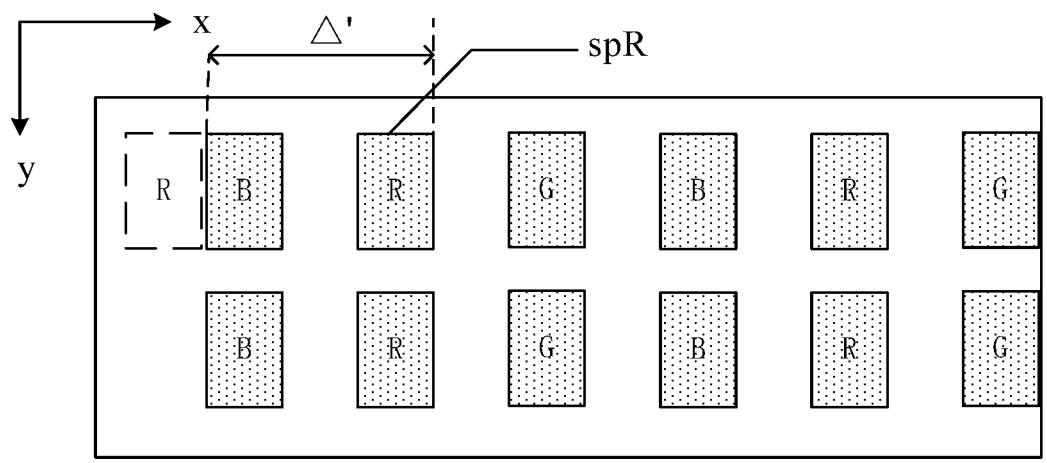
FIG. 9 illustrates grayscale of a second frame of image of an exemplary display panel consistent with various disclosed embodiments of the present disclosure.
Figure 10:
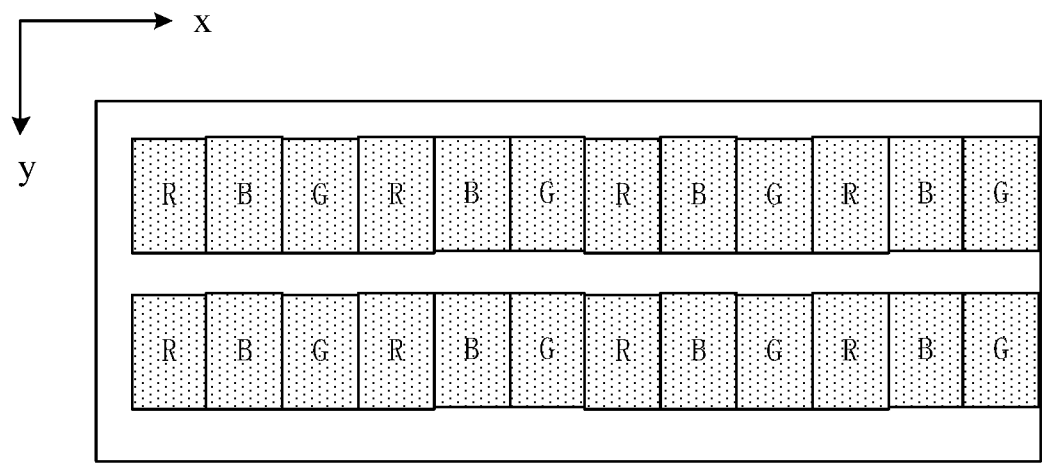
FIG. 10 illustrates grayscale after superimposing the two frames of images in FIG. 8 and FIG. 9 consistent with various disclosed embodiments of the present disclosure.

FIG. 8 illustrates a display position of a first frame of image of an exemplary display panel consistent with various disclosed embodiments of the present disclosure; and FIG. 9 illustrates a display position of a second frame of image of an exemplary display panel consistent with various disclosed embodiments of the present disclosure. FIG. 10 illustrates an exemplary display position after superimposing the two frames of images in FIG. 8 and FIG. 9. FIGS. 8-9 illustrate a same area of the display panel; and only four pixels are illustrated for illustrative purposes. One of the four pixels may include three sub-pixels of RGB. The condition that the first direction x and the second direction y intersect each other is illustrated in FIGS. 8-10. Along the first direction x, the distance between adjacent two sub-pixels may be equal to the width of one sub-pixel.

As shown in FIG. 8 and FIG. 9, because the light forming the first frame of image may be the o-light, and the light forming the second frame of image may be the e-light, the light-emitting positions of the light generated by the same sub-pixel in the two frames of images on the display panel may be shifted. The shift of the light-emitting position of the pixel in the second frame of image relative to the first frame of image along the first direction x as a whole is illustrated by the left most sub-pixel spR of the red pixel R in FIG. 8. Because the e-light may be shifted with respect to the optical path of the o-light, the position of the sub-pixel spR in the second frame of image may be illustrated as in FIG. 9. The offset Δ' of the sub-pixel spR along the first direction x may be equivalent to the total widths of the three sub-pixels. In particular, in one embodiment, the light-emitting position of the e-light in the second frame of image may be shifted a width of three sub-pixels along the first direction x relative to the light-emitting position of the o-light in the first frame of image. The result that the two frames of images in FIG. 8 and FIG. 9 are superimposed is illustrated in FIG. 10. As shown in FIG. 10, the result may be equivalent that the four pixels in the same region may be turned into eight pixels (one pixel still may include three sub-pixels of RGB). Thus, it may be equivalent that the number of display pixels may be visually increased at a certain time; and the resolution of the display panel may be increased.

Figure 11:
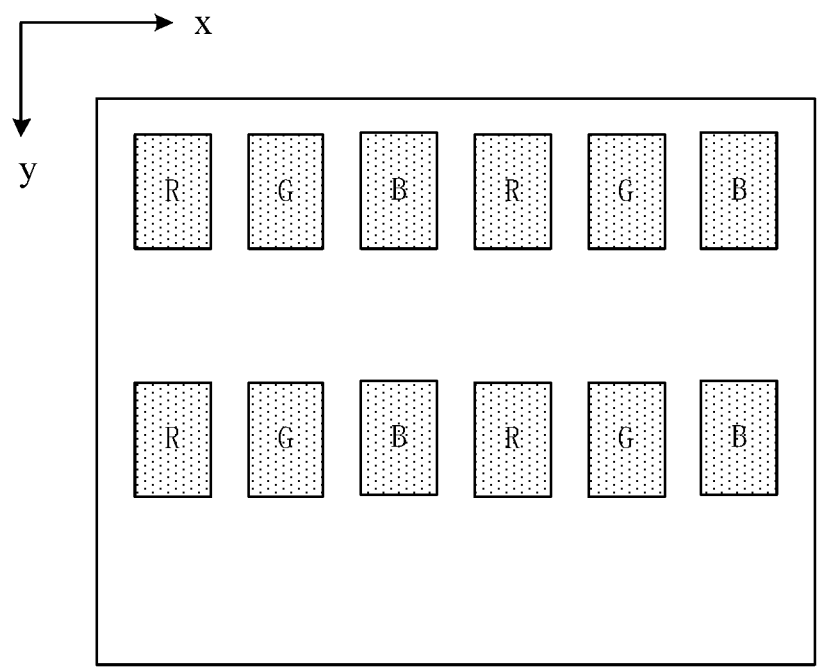
FIG. 11 illustrates an exemplary display position of a first frame of image of an exemplary display panel consistent with various disclosed embodiments of the present disclosure.
Figure 12:
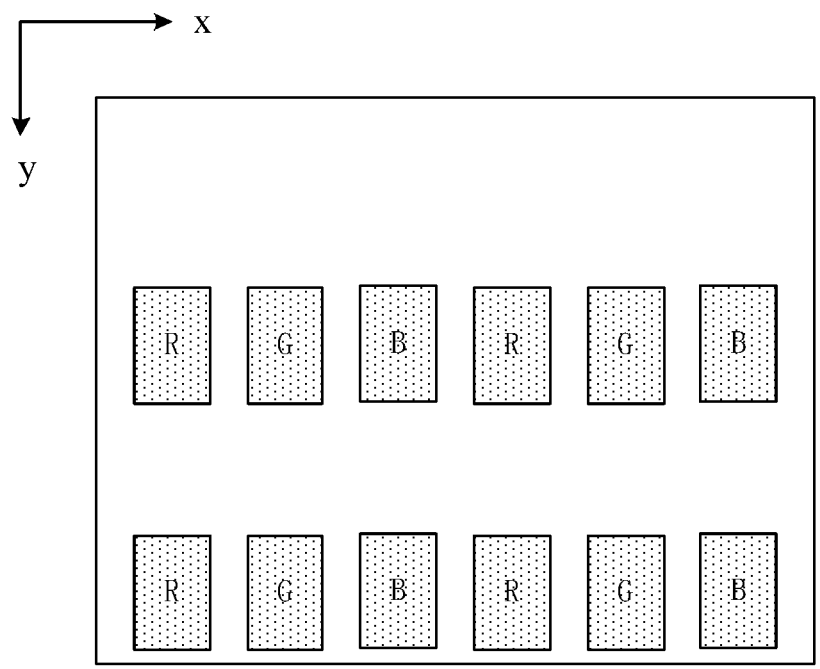
FIG. 12 illustrates an exemplary display position of a second frame of image of an exemplary display panel consistent with various disclosed embodiments of the present disclosure.
Figure 13:
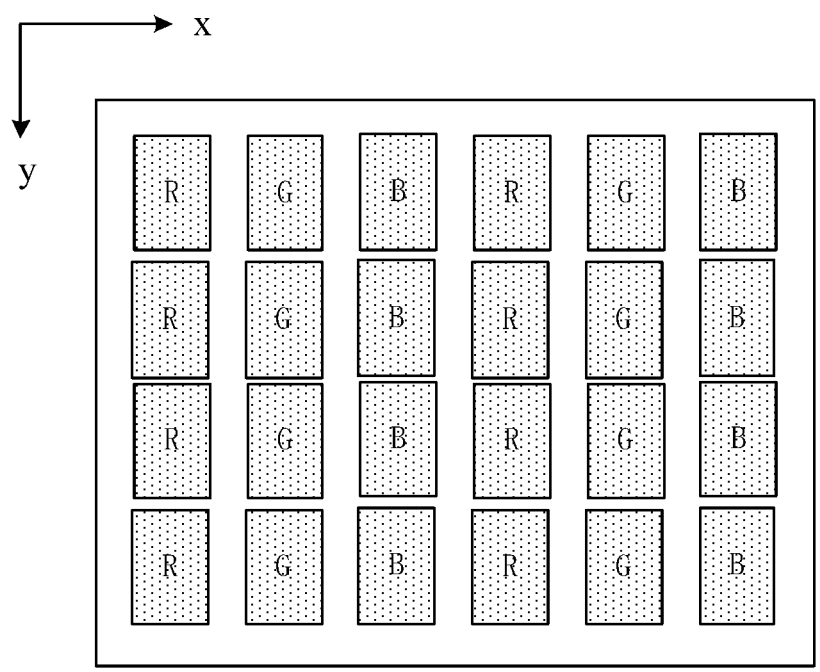
FIG. 13 illustrates an exemplary display position after superimposing the two frames of images in FIG. 11 and FIG. 12 consistent with various disclosed embodiments of the present disclosure.

FIG. 11 illustrates another display position of a first frame of image of an exemplary display panel consistent with various disclosed embodiments of the present disclosure. FIG. 12 illustrates another display position of a second frame of image of an exemplary display panel consistent with various disclosed embodiments of the present disclosure. FIG. 13 illustrates an exemplary display position after superimposing the two frames of images in FIG. 12 and FIG. 13. FIGS. 11-13 illustrate the same area of the display panel, and only four pixels are illustrated; and one of four pixels may include three sub-pixels of RGB. The condition that a first direction x and a second direction y intersecting each other is illustrated. As shown in FIG. 11 and FIG. 12, because the light forming the first frame of image may be the o-light, and the light forming the second frame of image may the e-light, the light-emitting positions of the light generated by the same sub-pixel in the two frames of images on the display panel may be shifted. The light-emitting position of the pixel in the second frame of image may be entirely shifted along the second direction y with respect to the entire first frame of image. Along the second direction y, the display position of the sub-pixel in the second frame of image may be located between two adjacent sub-pixels in the first frame of image. In particular, the light-emitting position of the e-light in the second frame of image may be shifted by a length of one sub-pixel along the second direction y relative to the light-emitting position of the o-light in the first frame of image. The result that the two frames of images in FIG. 11 and FIG. 12 are superimposed is illustrated in FIG. 13. The result may be equivalent that the four pixels in the same region may be turned into eight pixels (one pixel still may include three sub-pixels of RGB). Thus, it may be equivalent that the number of display pixels may be visually increased at a certain time; and the resolution of the display panel may be increased.

Figure 14:
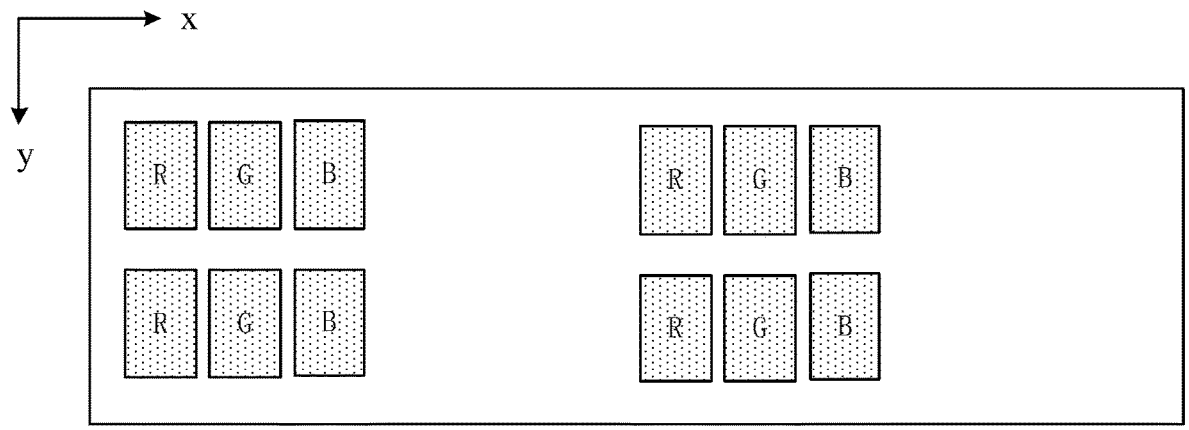
FIG. 14 illustrates another exemplary display position of a first frame of image of an exemplary display panel consistent with various disclosed embodiments of the present disclosure.
Figure 15:
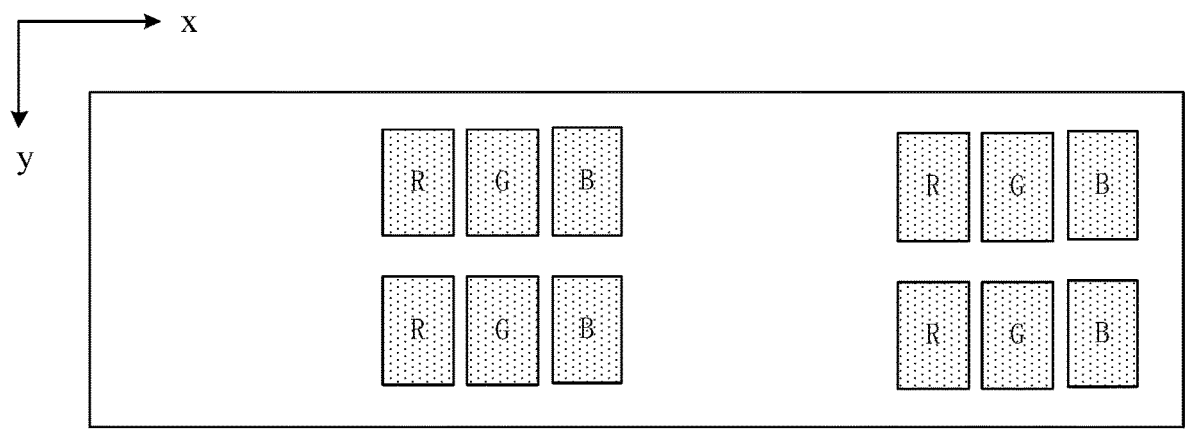
FIG. 15 illustrates another exemplary display position of a second frame of image of an exemplary display panel consistent with various disclosed embodiments of the present disclosure.
Figure 16:
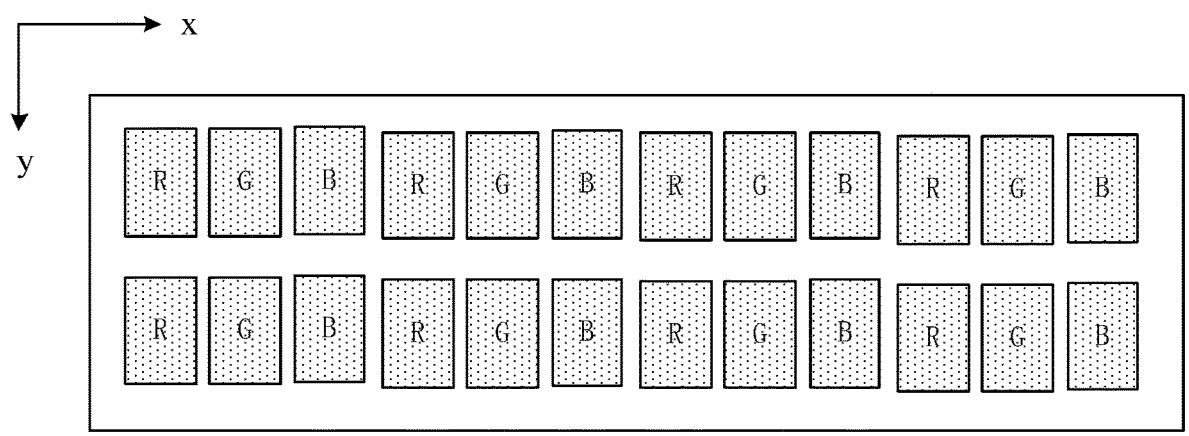
FIG. 16 illustrates an exemplary display position after superimposing the two frames of images in FIG. 14 and FIG. 15 consistent with various disclosed embodiments of the present disclosure.

FIG. 14 illustrates another display position of a first frame of image of an exemplary display panel consistent with various disclosed embodiments of the present disclosure. FIG. 15 illustrates another display position of a second frame of image of an exemplary display panel consistent with various disclosed embodiments of the present disclosure. FIG. 16 illustrates an exemplary display position after superimposing the two frames of images in FIG. 14 and FIG. 15. FIGS. 14-16 illustrate the same area of the display panel, and only four pixels are illustrated, and one of four pixels may include three sub-pixels of RGB. The condition that a first direction x and a second direction y intersecting each other are illustrated.

As shown in FIG. 14 and FIG. 15, because the light forming the first frame of images may be the o-light, and the light forming the second frame of image may the e-light, the light-emitting positions of the light generated by the same sub-pixel in the two frames of images on the display panel may be shifted. The light-emitting position of the pixel in the second frame of image may be entirely shifted along the second direction y with respect to the entire first frame of image. In particular, the light-emitting position of the e-light in the second frame of image may be shifted along the first direction x by a length of one pixel with respect to the light-emitting position of the o-light in the first frame of image. The result that the two frames of images in FIG. 14 and FIG. 15 are superimposed is illustrated in FIG. 16. The result may be equivalent that the four pixels in the same region may be turned into eight pixels (one pixel still may include three sub-pixels of RGB). Thus, it may be equivalent that the number of display pixels may be visually increased at a certain time; and the resolution of the display panel may be increased. Thus, the positions originally having no pixels may be virtually viewed as having pixels. It should be noted that the width of the strip patterns in the above drawings does not represent the actual width or proportion of the pixels.

In the display panel provided by the present disclosure, a structure having the birefringence characteristics may be formed by alternatively disposing at least two kinds of refractive regions having different refractive indexes on the display substrate. Further, the interface between the two adjacent refractive regions and the display surface of the display substrate may form an acute angle to ensure that the equivalent optical axis of the structure having the birefringent characteristics may form a non-zero angle with the display surface of the display substrate and to ensure that the optical paths of the o-light and the e-light incident into the structure having the birefringent characteristic may be separated. Accordingly, the polarization directions of the incident light of the birefringence layer may be controlled by the light valve to control the display panel to emit the o-light in the first frame of image and to emit the e-light in the second frame of image. Because the light-emitting position of the e-light may be shifted relative to the light-emitting position of the o-light, superimposing the first frame of image and the second frame of image may be able to visually increase the resolution.

In the related art, a liquid crystal cell or an anisotropic crystal material is often employed as the birefringent medium. For the approach using the liquid crystal cell, there are problems that the liquid crystal cell is thick, fragile, and high in cost. For the approach attaching the anisotropic crystal on the surface of the display substrate, there are problems that the processing is difficult, and the adhesion is low. Further, for the approach forming the anisotropic crystal on the surface of the display substrate by a coating process, there is a problem that it is difficult for the thin film deposition technique to form a single crystal thin film on a large-area substrate. In the present disclosure, at least two kinds of refractive regions having different refractive indexes may be alternately arranged to form a structure having birefringent characteristics. Such a structure may be formed by a photolithography process or a nanoimprint lithography process; and the process may be relatively mature, and simple. Further, a substantially small thickness may be achieved, and it may be beneficial to the reduction of the overall thickness of the display panel.

In one embodiment, the light valve in the display panel provided by the present disclosure may include a liquid crystal layer and a polarizer. The polarizer may be disposed on a side of the liquid crystal layer away from the birefringence layer.

Figure 17:
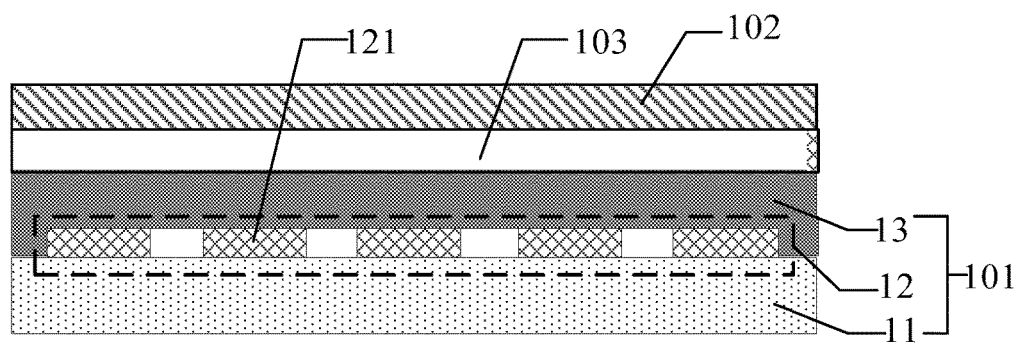
FIG. 17 illustrates another exemplary display panel consistent with various disclosed embodiments of the present disclosure.

In one embodiment, the display substrate 101 in the present disclosure may be an organic light-emitting display substrate. FIG. 17 illustrates a cross-sectional view of another exemplary display panel consistent with various disclosed embodiments of the present disclosure. As shown in FIG. 17, the display substrate 101 may be an organic light-emitting display substrate. The display substrate 101 may include an array substrate 11, an organic light-emitting device layer 12 on the array substrate 11, and an encapsulation layer 13 encapsulating the organic light-emitting device layer 12. The organic light-emitting device layer 12 may include a plurality of optical device layers 121. The encapsulation layer 13 may be a thin film encapsulation structure including at least one organic encapsulation layer and at least one inorganic encapsulation layer. The encapsulation layer 13 may be able to block water and oxygen to enhance the service life of the optical device layers 121.

In one embodiment, referring to FIG. 2 or FIG. 3, in the first region Q1, all the first interfaces J1 may have a same inclining direction with the display surface M of the display substrate 101. Because the refractive regions may be regularly arranged, and the fabrication process may be simplified.

In one embodiment, referring to FIG. 2 or FIG. 3, in the first region Q1, all the first interfaces J1 may be parallel to each other. There may be some differences in the angle between the acute angles between the first interface and the display surface due to process errors during the fabrication process, approximate parallel due to process errors is also within the scope of the present disclosure.

In some other embodiments, the acute angle $\alpha$ between the first interface and the display surface may be set as $10°\leq\alpha\leq80°$. The relationship between the value of a and the magnitude of the deflection angle $\theta$ of the e-light is extensively investigated. As shown in FIG. 5, the deflection angle $\theta$ of the e-light may be a deflected angle of the propagation direction of the e-light in the birefringent structure respect to the propagation direction of the o-light. The offset $\Delta$ of the e-light may be the distance between the light-emitting position of the e-light and the light-emitting position of the o-light along the first direction a. The larger the deflection angle $\theta$ of the e-light is, the larger the offset $\Delta$ of the e-light is.

In one embodiment, an experiment was carried on under the condition that a repeating unit includes a first refractive zone and a second refraction zone sequentially arranged; the refractive index of the first refractive region is n1=2.4; and the refractive index of the second refraction zone is n2=1. Table 1 illustrates an exemplary data relationship between the acute angles α and the deflection angles θ of the e-light.

TABLE 1

The data relationship between the acute α and the deflection angle θ of the e-light

| Degree (°) | Plan 1 | Plan 2 | Plan 3 | Plan 4 | Plan 5 | Plan 6 | Plan 7 | Plan 8 |
|---|---|---|---|---|---|---|---|---|
| α | 10 | 20 | 30 | 40 | 50 | 60 | 70 | 80 |
| θ | 5 | 10 | 15 | 18 | 20 | 20 | 17 | 10 |

According to the experimental result illustrated in Table 1, as the acute α gradually increases, the deflection angle θ of the e-light may first increase; and then may decrease. Referring to FIG. 5, the larger the deflection angle θ of the e-light is, the larger the offset Δ of the e-light is. The maximum deflection angle θ of the e-light may be approximately 20° in the case where n1=2.4 and n2=1. In the present disclosure, 10°≤α≤80°, such an acute angle range may ensure that the optical paths of the o-light and the e-light of the light incident into the birefringent structure to be separated. In particular, the optical path of the e-light may be deflected in the birefringent structure. Thus, it may ensure that the light-emitting position of the e-light may be shifted by a certain amount with respect to the light-emitting position of the o-light. Accordingly, the polarization direction of the incident light of the birefringence layer may be controlled by the light valve to control the display panel to emit the o-light at the first frame of image and to control the display panel to emit the e-light at the second frame of image. Because the light-emitting position of the e-light may be deflected relative to the light-emitting position of the o-light, the superimposition of the first frame of image and the second frame of image may be able to visually improve the resolution of the display panel.

In one embodiment, in one combination of the refractive indexes, 30°≤α≤60°. In particular, the angle between the interface where the two refractive layers are in contact and the display surface of the display substrate may not be too small, the refractive index of the first refractive region may be n1=2.4, and the refractive index of the second refractive region may n2=1. In one embodiment, the first refractive region may be an organic material, and the second refractive region may be filled with air. The first refractive region in the refraction layer may be formed by an etching process, and the fabrication process may be relatively simple.

In one embodiment, an experiment was carried on under the condition that a repeating unit includes a first refractive region and a second refractive region sequentially arranged; the refractive index of the first refractive region is n1=2.4; and the refractive index of the second refraction zone is n2=1.4. Table 2 illustrates an exemplary data relationship between the acute angles α and the deflection angles θ of the e-light.

According to the experimental result illustrated in Table 2, as the acute α changes gradually increase, the deflection angle θ of the e-light may first increase; and then decrease. Referring to FIG. 5, the larger the deflection angle θ of the e-light is, the larger the offset Δ of the e-light is. The maximum deflection angle θ of the e-light may be approximately 9° in the case where n1=2.4 and n2=1.4. In the present disclosure, 10°≤α≤80°, such an acute angle range may ensure that the optical paths of the o-light and the e-light of the light incident into the birefringent structure to be separated. In particular, the optical path of the e-light may be deflected in the birefringent structure. Thus, it may ensure that the light-emitting position of the e-light may be shifted by a certain amount with respect to the light-emitting position of the o-light. Accordingly, the polarization direction of the incident light of the birefringent structure may be controlled by the light valve to control the display panel to emit the o-light at the first frame of image and to control the display panel to emit the e-light at the second frame of image. Because the light-emitting position of the e-light may be deflected relative to the light-emitting position of the o-light, the superimposition of the first frame of image and the second frame of image may be able to visually improve the resolution.

In one embodiment, in one combination of the refractive indices, 30°≤α≤60°. In particular, the angle between the interface where the two refractive layers are in contact and the display surface of the display substrate may not be too small. The first refraction region in the refraction layer may be formed by an etching process, and the fabrication process may be relatively simple.

In some embodiments, in the display panel provided by the present disclosure, one repeating unit may include a refractive region filled with air. Taking one repeating unit including two refractive regions having different refractive indices as an example, one of the refractive regions may be filled with air, and the other refractive region may be filled with an organic material or an inorganic material. For the example that one repeating unit includes three refractive regions having different refractive indexes, one of the refractive regions may be filled with air, and the other two refractive regions may be filled with an organic material or an inorganic material.

In some embodiments, in the display panel provided by the present disclosure, each of the refractive regions in one of the repeating units may be filled with an organic material or an inorganic material, and more sulfur or aromatic rings

TABLE 1

The data relationship between the acute angle α and the deflection angle θ of the e-light

| Degree (°) | Plan 1 | Plan 2 | Plan 3 | Plan 4 | Plan 5 | Plan 6 | Plan 7 | Plan 8 |
|---|---|---|---|---|---|---|---|---|
| α | 10 | 20 | 30 | 40 | 50 | 60 | 70 | 80 |
| θ | 2.5 | 5 | 7 | 8.5 | 9 | 8.3 | 6 | 3.5 | may be added in the refractive region having a higher refractive index; and less sulfur or aromatic rings may be added in the refractive region having a lower refractive index. The refractive index of a material may be affected by its functional groups, and the refractive index of the material may be adjusted by adjusting the amount of the sulfur element or the aromatic polymer in the material to obtain a material having different refractive indexes. Alternatively, the material having a higher refractive index may be $TiO_2$ (n=2.5), $Ta_2O_5$ (n=2.3), or ZnS (n=2.4), etc., and the material having a lower refractive index may be MgF (n=1.4), or $SiO_2$. (n=1.5), etc.

In the present disclosure, the display surface of the display substrate may have a plurality of sub-pixels arranged as an array, and a first region may correspond to a plurality of sub-pixels along a direction perpendicular to the display panel. In particular, the first region may simultaneously adjust the light-emitting directions of the plurality of sub-pixels to control the display panel by the light valve to emit the o-light emission in the first frame of image and to emit the e-light emission in the second frame of image. Because the light-emitting position of the e-light may be deflected relative to the light-emitting position of the o-light, the superimposition of the first frame of image and the second frame of image may visually improve the resolution.

In some embodiments, in the display panel provided by the present disclosure, the repeating unit may include a first refractive region and a second refractive region that are sequentially arranged. The refractive index of the first refractive region may be n1; the refractive index of the second refractive region may be n2; and 0.5≤n1−n2≤2. In one embodiment, n1=2.5; and n2=1. For example, the first refraction region may be filled with $TiO_2$, and the second refractive region may be filled with air. In another embodiment, n1=2.5, and n2=1.4. For example, the first refractive region may be filled with $TiO_2$, and the second refractive region may be filled with MgF. In some embodiments, the refractive index of the refractive region may be adjusted by adjusting the ratio of the sulfur element or the aromatic ring in the refractive region. Further, a repeating unit including only two refractive regions of different refractive indexes may be able to form a structure having birefringent characteristics. During the manufacturing process, the structure of the repeating unit may be relatively simple; and the complexity of the manufacturing process may be reduced.

In one embodiment, referring to FIG. 2, the repeating unit Y may include a first refractive region Z1 and a second refractive region Z2 that may be sequentially arranged. Along the second direction b, the width of the first refractive area Z1 may be f1; and the width of the second refractive region Z2 may be f2; and 15 nm≤f1+f2≤200 nm. In particular, along the second direction b, the width of the one repeating unit Y may be referred to as f; and 15 nm≤f≤200 nm. Such a configuration may ensure the width of one repeating unit Y to be substantially small and smaller than the wavelength of light emitted from the display substrate. Thus, the diffraction phenomenon may be effectively reduced, and the influence of the diffraction phenomenon on the display effect of the display panel may be effectively avoided.

In the same repeating unit, the ratio between the refractive index of the higher refractive index region to the refractive index of the lower refractive index region may also affect the birefringent characteristics of the birefringent structure. Some experiments were carried on to prove such a factor.

In one experiment, as shown in FIG. 2, the repeating unit Y may include a first refractive region Z1 and a second refractive region Z2 which are sequentially arranged; and the width of the first refractive region along the second direction b may be f1; and the width of the second refractive region may be f2. The conditions that the refractive index of the first refraction region is n1=2.4, and the refractive index of the second refractive region is n2=1.4 are used to carry on the experiment. q may be referred to as the filling ratio of the refractive region having a higher refractive index in the repeating unit; and $$q = \frac{f1}{f1+f2}.$$

Figure 18:
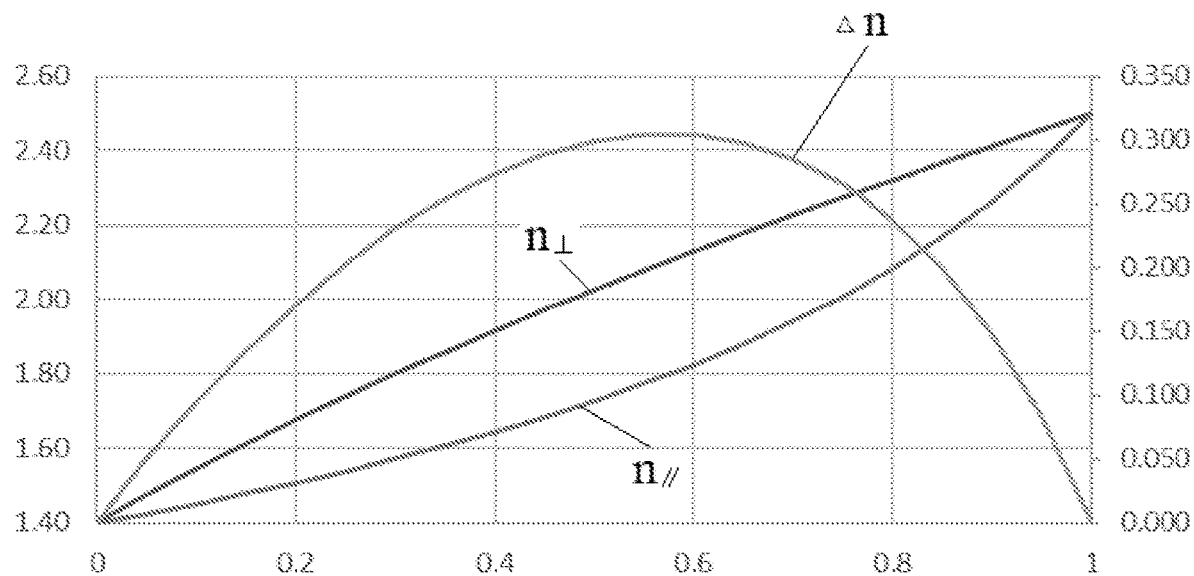
FIG. 18 illustrates an exemplary relationship between refractive indexes in different polarization directions and filling ratios consistent with various disclosed embodiments of the present disclosure.

FIG. 18 illustrates an exemplary relationship between the refractive indexes of different polarization directions and the filling ratio q. $n_\parallel$ is the equivalent refractive index when the polarization direction of the light is parallel to the optical axis S of the birefringent structure; and $n_\perp$ is the equivalent refractive index when the polarization direction of the light is perpendicular to the optical axis S of the birefringent structure. Δn refers to as the difference between $n_\parallel$ and $n_\perp$. In the material having the birefringent characteristics, the larger the Δn is, the larger the angle at which the e-light is deflected relative to the o-light is. As shown in FIG. 18, $n_\parallel$ and $n_\perp$ correspond to the coordinate on the left side of the graph, and Δn corresponds to the coordinate on the right side of the graph, and the filling ratio q corresponds to the abscissa. As the filling ratio q increases from 0 to 1, Δn may increase first and then decrease. In particular, the deflected angle of the e-light relative to the o-light may increase first; and then decrease. When q=0.6, Δn may be at the maximum; and may be approximately 0.31. When 0.2≤q≤0.8, 0.16≤Δn≤0.31.

In another embodiment, as shown in FIG. 2, the repeating unit Y may include a first refractive region Z1 and a second refractive region Z2 which are sequentially arranged; and the width of the first refractive region along the second direction b may be f1; and the width of the second refractive region may be f2. The conditions that the refractive index of the first refraction region is n1=2.4

Figure 19:
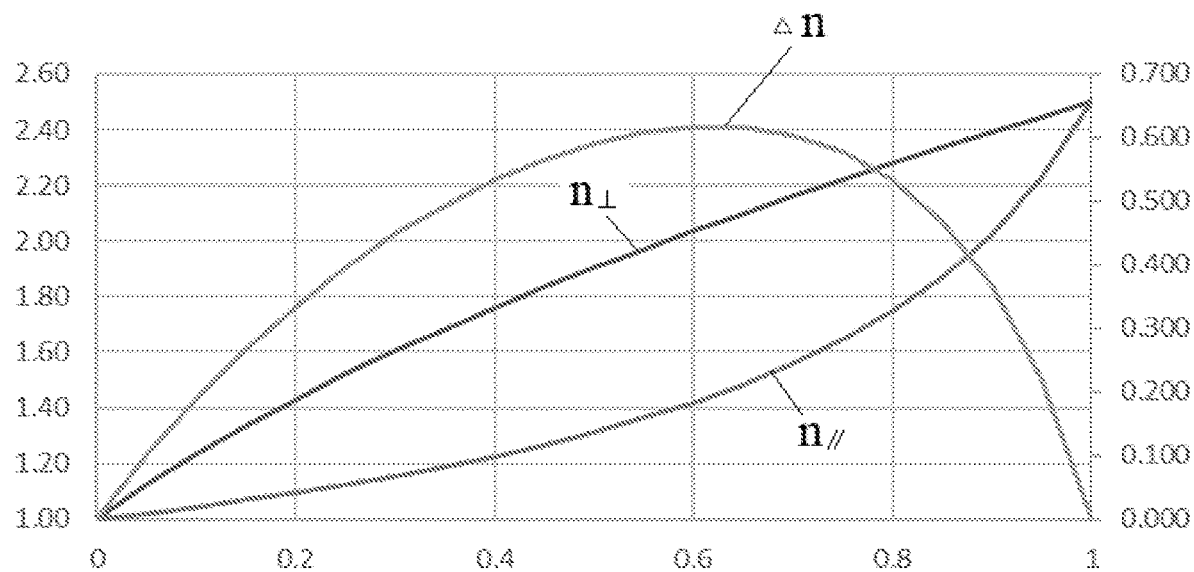
FIG. 19 illustrates an exemplary relationship between refractive indexes in different polarization directions and filling ratios consistent with various disclosed embodiments of the present disclosure.

FIG. 19 illustrates another exemplary relationship between the refractive indexes of different polarization directions and the filling ratio q. As shown in FIG. 19, $n_\parallel$ and $n_\perp$ correspond to the coordinate on the left side of the graph, and Δn corresponds to the coordinate on the right side of the graph, and the filling ratio q corresponds to the abscissa. As the filling ratio q increases from 0 to 1, Δn may increase first and then decrease. In particular, the deflected angle of the e-light relative to the o-light may increase first and then decrease. When q=0.6, Δn may be the maximum; and may be approximately 0.6. When 0.2≤q≤0.8, 0.34≤Δn≤0.6.

In one embodiment, along the second direction b, the width of the first refractive region may be f1 and the width of the second refractive region may be f2; and $$0.2 \le \frac{f1}{f1+f2} \le 0.8.$$

In particular, 0.2≤q≤0.8. Taking n1=2.4 and n2=1.4 as an example, the condition that Δn may vary between 0.16 and 0.31 may be satisfied. Taking n1=2.4 and n2=1 as an example, the condition that Δn may vary from 0.34 to 0.6 may be satisfied. During the design process, the materials of the first refraction region and the second refractive region may be selected according to the design requirements, and the magnitude of the q value may be adjusted to realize the optical paths of the o-light and the e-light may be distinguished (separated) after the light is incident into the birefringent structure.

In another example, $$\frac{f1}{f1+f2} = 0.6,$$

in particular, q=0.6. According to experimental data, when the filling ratio of the refractive region having the higher refractive index is 0.6, the value of Δn is may be at the maximum. In particular, in the birefringent structure provided by the present disclosure, the deflected angle of the e-light relative to the o-light may be at the maximum. The resolution of the display panel may be increased by simultaneously considering the pixel size and the shifted amount required to cause the e-light to shift relative to the o-light.

Figure 20:
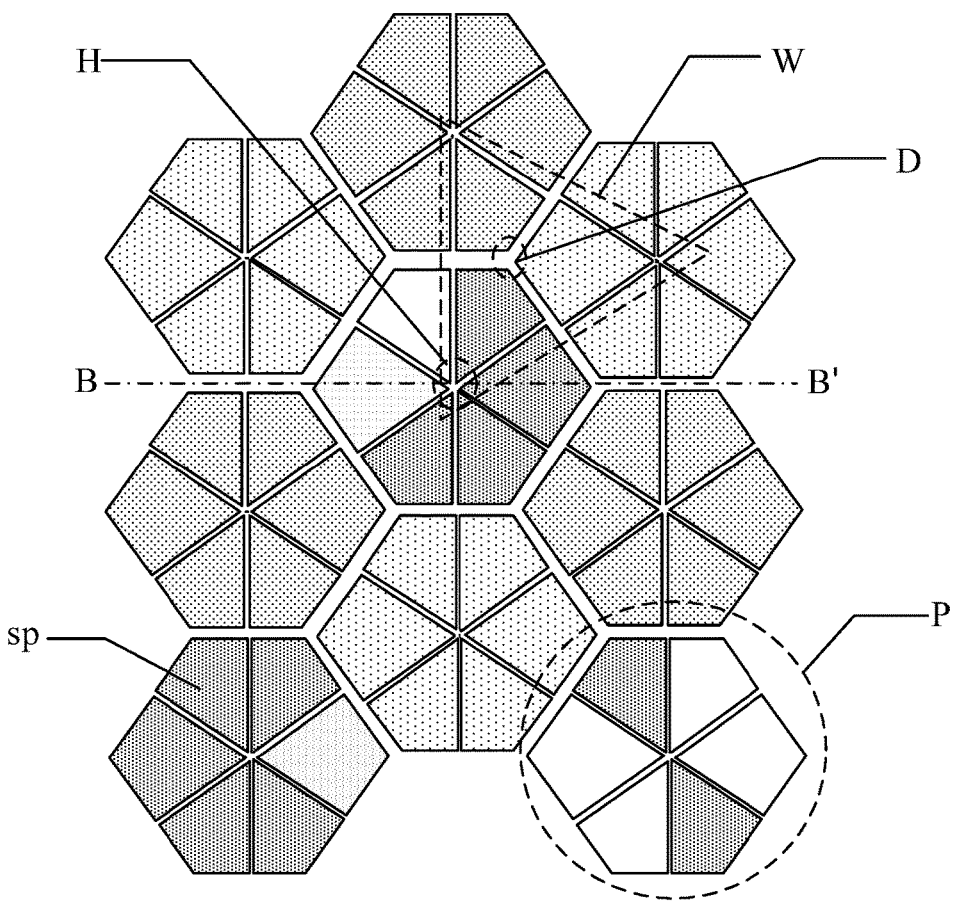
FIG. 20 illustrates another exemplary display panel consistent with various disclosed embodiments.
Figure 21:
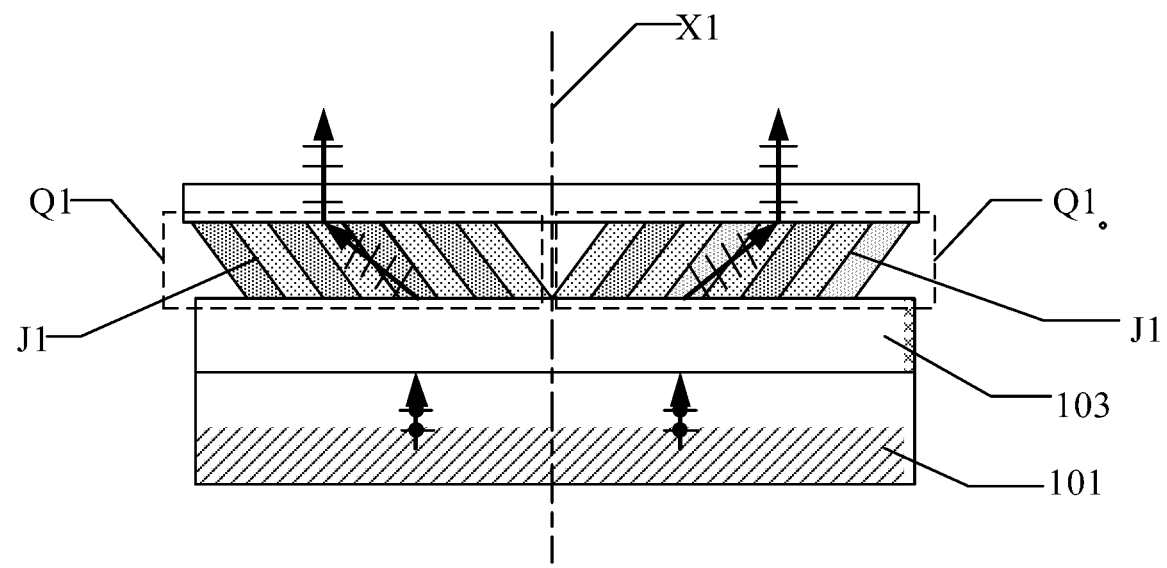
FIG. 21 illustrates a B-B'-sectional view of the display panel in FIG. 20 consistent with various disclosed embodiments of the present disclosure.

In one embodiment, FIG. 20 illustrates another exemplary display panel consistent with various disclosed embodiments of the present disclosure. FIG. 21 is a B-B'-sectional view of the display panel in FIG. 20.

As shown in FIG. 20, a top view of a partial region of the display substrate of the display panel is illustrated. The display surface of the display substrate 101 may include a plurality of pixel regions P arranged as an array, and the colors of the plurality of sub-pixels sp in a same pixel region P may be the same. Along a direction perpendicular to the display panel, a first region Q1 may correspond to one sub-pixel sp. A number of the pixel regions of the plurality pixel regions P may have an intersection region H. Each sub-pixel sp in the same pixel region P may all be adjacent to the intersection region H. As shown in FIG. 21, the straight line intersecting the intersection region H and perpendicular to the display panel may be referred to as a first straight line X1. Among the plurality of first areas Q1 corresponding to the same pixel region P, any first interface J1 in one of the first areas Q1 may be inclined in a direction away from the first straight line X1. For illustrative purposes, in FIG. 21, only the first region including the two refractive regions having different refractive indexes and alternatively arranged is illustrated; and FIG. 21 only illustrates a partial film structure of the display panel.

In one embodiment, when the display panel illustrated in FIG. 20 is in operation, the region W may display as one pixel unit, and it may be equivalent that the sub-pixels sp corresponding to three different colors may constitute one pixel unit, and point D may be configured a as a central area of one pixel unit. According to the principle described in the previous embodiments, the birefringence structure formed in the first region in the present disclosure may be a negative optical axis birefringent structure. When the light valve 103 is used to control the polarization direction of the incident light of the first region and when the polarization direction of the incident light is parallel to the polarization direction of the e-light, the optical path of the e-light in the first region Q1 may be as shown in FIG. 21. In particular, after being refracted in the first region Q1, the light emitted by the sub-pixels may all be shifted away from the intersection region H. Referring to FIG. 14, in one embodiment, a plurality of sub-pixels of a same color may together be used to form a pixel region. When the display substrate is an organic light-emitting display substrate and when the pixel region is formed by an evaporation process, because the colors of the sub-pixels in the pixel region may be the same, crosstalk of different colors of sub-pixels during the evaporation process may be avoided. However, such a design may result in uneven sub-pixels of different colors. Designing the light emitted by the sub-pixels to be all shifted away from the intersection H may facilitate the dispersion of light emitted from the sub-pixels of the same color. At the same time, the light emitted by the sub-pixels may be shifted toward the central region of the pixel unit. In particular, when the pixel unit is displayed, the light emitted by the different colors of sub-pixels may all be shifted toward the central region of the pixel unit; and the light mixing effect of the pixel unit may be enhanced.

In one embodiment, referring to FIG. 20, the intersection region H may be located at the center of the pixel region P. When the pixel unit having the sub-pixels sp in one pixel region P and a sub-pixels sp having a different color in adjacent pixel region P is in operation, the areas of sub-pixels in one pixel region P may be the same; and the areas of all the pixels may be the same. Accordingly, the display performance of the display panel may be uniform.

Figure 22:
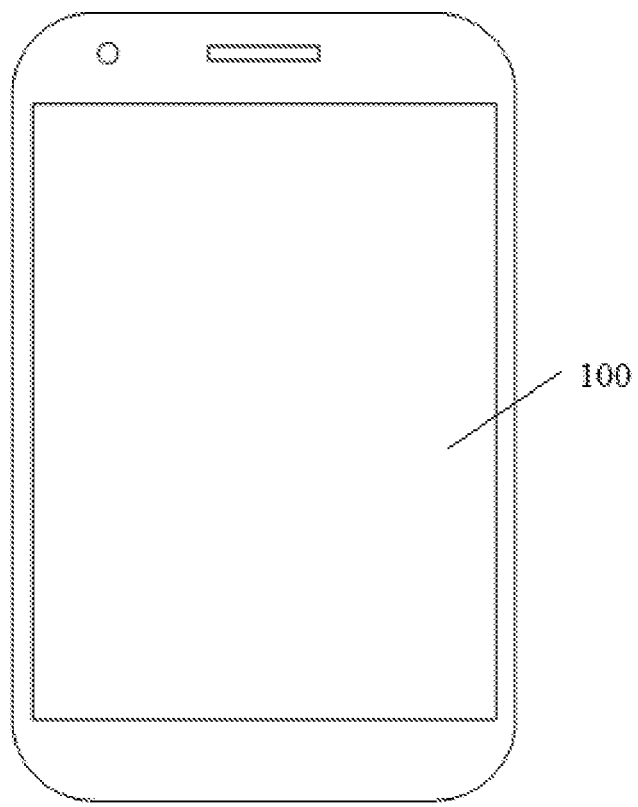
FIG. 22 illustrates an exemplary display apparatus consistent with various disclosed embodiments of the present disclosure.

The present disclosure also provides a display apparatus. FIG. 22 illustrates an exemplary display apparatus consistent with various disclosed embodiments of the present disclosure.

As shown in FIG. 22, the display apparatus may include a display panel 100. The display panel 100 may be a display panel provided by the present disclosure. The display apparatus provided by the present disclosure may be any electronic products having a display function, including but not limited to the following categories: television, laptop computer, desktop display, tablet computer, digital camera, mobile phone, smart bracelet, smart glasses, on-board display, medical equipment, industrial equipment, or touch interactive terminals, etc.

The display panel and the display apparatus provided by the present disclosure may achieve at least the following beneficial effects.

For the present disclosed display panel, a structure having birefringent characteristics may be formed on the display substrate by arranging at least two kinds of refractive regions having different refractive indexes. An acute angle may be formed between the interface between the two refractive regions and the display surface of the display substrate to ensure the equivalent optical axis of the structure having the birefringent characteristic to form a non-zero angle with the display surface of the display substrate, and ensure the optical paths of the o-light and the e-light be separated. Thus, the polarization direction of the incident light of the birefringence layer may be controlled by the light valve to control the display panel to emit the o-light at the first frame of image and to emit the e-light at the second frame of image. Because the light emitting position of the e-light may be shifted relative to the light-emitting position of the o-light, the superimposition of the first frame of image and the second frame of image may visually improve the resolution of the display panel.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A display panel, comprising:
a display substrate;
a birefringence layer disposed on a display surface of the display substrate, wherein the birefringence layer includes at least one first region, the at least one first region is disposed at least in a display region, in the first region: a plurality of repeating units are sequentially disposed along a first direction parallel to the display surface of the display substrate, and one of the plurality of repeating units includes at least two refractive regions that are sequentially arranged along the first direction; and
a light valve disposed between the display substrate and the birefringence layer,
wherein:
in each of the plurality of repeating units, refractive indexes of all refractive regions of the at least two refractive regions are different from each other;
an interface between any adjacent refractive regions is a first interface and the first interface is parallel to an immediate adjacent first interface;
the first interface forms an acute angle α with the display surface of the display substrate;
a sum width the at least two refractive regions of each repeating unit along a second direction perpendicular to the first interface is f;
λ is a wavelength of light emitted from the display substrate;

$f<\lambda$;

the light valve is configured to control a polarization direction of an incident light of the birefringence layer to be a first polarization direction at a first time point, and to control the polarization direction of the incident light of the birefringence layer to be a second polarization direction at a second time point; and
the birefringence layer is configured to generate an ordinary light when receiving the incident light at the first polarization direction to allow forming a first frame of image for the incident light received at the first time point, and to generate an extraordinary light when receiving the incident light at the second polarization direction to allow forming a second frame of image for the incident light received at the second time point, wherein light emitting positions of light generated by a same sub-pixel in the first frame of image and the second frame of image on the display panel are relatively shifted.

2. The display panel according to claim 1, wherein:
in the at least one first region, inclining directions of all first interfaces relative to the display surface of the display substrate are same.

3. The display panel according to claim 2, wherein:
in the at least one first region, all first interfaces are parallel to each other.

4. The display panel according to claim 1, wherein:

$10°\leq \alpha \leq 80°$.

5. The display panel according to claim 1, wherein:
each of the plurality of repeating units includes a first refractive region and a second refractive region that are sequentially arranged;
a refractive index of the first refractive region is n1;
a refractive index of the second refractive region is n2; and $0.5 \leq n1-n2 \leq 2$.

6. The display panel according to claim 5, wherein:
along the second direction, a width of the first refractive region is f1 and a width of the second refractive region is f2; and $15 \text{ nm} \leq f1+f2 \leq 200 \text{ nm}$.

7. The display panel according to claim 5, wherein:
along the second direction, a width of the first refractive region is f1 and a width of the second refractive region is f2; and $$0.2 \leq \frac{f1}{f1+f2} \leq 0.8.$$

8. The display panel according to claim 7, wherein:

$$\frac{f1}{f1+f2} = 0.6.$$

9. The display panel according to claim 1, wherein:
one of the plurality of repeating units includes a refractive region filled with air.

10. The display panel according to claim 1, wherein:
the display surface of the display substrate has a plurality of sub-pixels arranged as a matrix; and
along a direction perpendicular to the display panel, one first region of the at least one first region corresponds to a number of sub-pixels of the plurality of the sub-pixels.

11. The display panel according to claim 1, wherein:
the display surface of the display substrate includes a plurality of pixel regions arranged as a matrix;
sub-pixels in a same pixel region of the plurality of pixel regions have a same color;
along a direction perpendicular to the display panel, one first region of the at least one first region corresponds to one sub-pixel of the plurality of sub-pixels;
each of the plurality of pixel regions includes a center region;
each sub-pixel in a same pixel region of the plurality of pixel regions is adjacent to a corresponding center region;
a straight line intersecting the center region and perpendicular to the display panel is a first straight line; and
in a plurality of first regions corresponding to a same pixel region of the plurality of pixel regions, each first interface in any of the plurality of first regions is inclined away from the first straight line.

12. The display panel according to claim 11, wherein:
the center region is located at a center region of the number of pixel regions.

13. A display apparatus, comprising:
a display panel,
wherein the display panel includes:
a display substrate;
a birefringence layer, disposed on a display surface of the display substrate, wherein the birefringence layer includes at least one first region, the at least one first region is disposed at least in a display region, in the first region: a plurality of repeating units are sequentially disposed along a first direction parallel to the display surface of the display substrate, and one of the plurality of repeating units includes at least two refractive regions that are sequentially arranged along the first direction to form; and a light valve disposed between the display substrate and the birefringence layer, wherein:

in each of the plurality of repeating units, refractive indexes of the at least two refractive regions are different from each other;

an interface between any adjacent refractive regions is a first interface and the first interface is parallel to an immediate adjacent first interface;

the first interface forms an acute angle α with the display surface of the display substrate;

a sum width the at least two refractive regions of each repeating unit along a second direction perpendicular to the first interface is f;

λ is a wavelength of light emitted from the display panel; and $f<\lambda$;

the light valve is configured to control a polarization direction of an incident light of the birefringence layer to be a first polarization direction at a first time point, and to control the polarization direction of the incident light of the birefringence layer to be a second polarization direction at a second time point; and the birefringence layer is configured to generate an ordinary light when receiving the incident light at the first polarization direction to allow forming a first frame of image for the incident light received at the first time point, and to generate an extraordinary light when receiving the incident light at the second polarization direction to allow forming a second frame of image for the incident light received at the second time point, wherein light emitting positions of light generated by a same sub-pixel in the first frame of image and the second frame of image on the display panel are relatively shifted.

\* \* \* \* \*